(12) United States Patent
Henderson et al.

(10) Patent No.: US 10,752,522 B2
(45) Date of Patent: Aug. 25, 2020

(54) COMPOSITIONS AND METHODS FOR SELENIUM REMOVAL

(71) Applicant: CHEMTREAT, INC., Glen Allen, VA (US)

(72) Inventors: William H Henderson, Glen Allen, VA (US); John Philip Richardson, Hanover, VA (US); Vladimir Djukanovic, Glen Allen, VA (US)

(73) Assignee: CHEMTREAT, INC, Glen Allen, VA (US)

( * ) Notice: Subject to any disclaimer, the term of this patent is extended or adjusted under 35 U.S.C. 154(b) by 0 days.

(21) Appl. No.: 16/105,356

(22) Filed: Aug. 20, 2018

(65) Prior Publication Data

US 2019/0055140 A1    Feb. 21, 2019

Related U.S. Application Data

(60) Provisional application No. 62/547,280, filed on Aug. 18, 2017.

(51) Int. Cl.
  *C02F 1/42* (2006.01)
  *B01J 41/05* (2017.01)
  (Continued)

(52) U.S. Cl.
  CPC ............ *C02F 1/42* (2013.01); *B01J 20/0207* (2013.01); *B01J 20/321* (2013.01); *B01J 20/3204* (2013.01); *B01J 20/3236* (2013.01); *B01J 20/3293* (2013.01); *B01J 20/3433* (2013.01); *B01J 20/3475* (2013.01); *B01J 41/05* (2017.01); *B01J 41/14* (2013.01); *B01J 47/016* (2017.01); *B01J 47/02* (2013.01); *B01J 49/07* (2017.01); *B01J 49/57* (2017.01); *C02F 1/288* (2013.01); *C02F 1/74* (2013.01); *C02F 2001/422* (2013.01); *C02F 2001/425* (2013.01); *C02F 2101/106* (2013.01); *C02F 2103/34* (2013.01); *C02F 2303/16* (2013.01)

(58) Field of Classification Search
  None
  See application file for complete search history.

(56) References Cited

U.S. PATENT DOCUMENTS 4,915,928 A * 4/1990 Marcantonio ............ B01J 41/05
                                                           210/670
5,603,838 A * 2/1997 Misra ...................... C02F 1/281
                                                           210/665

(Continued)

OTHER PUBLICATIONS

International Searching Authority, Notification of Transmittal of the International Search Report and the Written Opinion of the International Searching Authority, of the Declaration, dated Nov. 21, 2018, pp. 8.

*Primary Examiner* — Chester T Barry
(74) *Attorney, Agent, or Firm* — Oliff PLC

(57) ABSTRACT

Methods for removing a target selenium entity from fluids by treating the fluid with a rare earth impregnated media containing an immobilized rare earth. The methods including obtaining a contaminated fluid comprising water and dissolved selenate; contacting the feed fluid with a rare earth impregnated media for removal of at least a portion of the selenate from the feed fluid thereby forming a treated fluid comprising less selenium than the feed fluid.

19 Claims, 3 Drawing Sheets

(51) Int. Cl.
  B01J 41/14 (2006.01)
  B01J 47/02 (2017.01)
  B01J 49/57 (2017.01)
  B01J 20/34 (2006.01)
  B01J 20/32 (2006.01)
  B01J 49/07 (2017.01)
  B01J 47/016 (2017.01)
  B01J 20/02 (2006.01)
  C02F 103/34 (2006.01)
  C02F 101/10 (2006.01)
  C02F 1/28 (2006.01)
  C02F 1/74 (2006.01)

(56) References Cited

U.S. PATENT DOCUMENTS

| | | | | |
|---|---|---|---|---|
| 5,855,789 A * | 1/1999 | Smith | ............ | C02F 1/285 |
| | | | | 210/670 |
| 6,090,290 A * | 7/2000 | Goodman | ............ | C02F 1/54 |
| | | | | 210/666 |
| 6,136,199 A * | 10/2000 | SenGupta | ............ | B01J 41/04 |
| | | | | 210/670 |
| 6,197,201 B1 * | 3/2001 | Misra | ............ | C02F 1/5236 |
| | | | | 210/721 |
| 7,407,587 B1 * | 8/2008 | Moller | ............ | B01J 20/06 |
| | | | | 210/683 |
| 7,572,322 B2 * | 8/2009 | Bohringer | ............ | A62D 5/00 |
| | | | | 2/457 |
| 8,043,586 B2 * | 10/2011 | Tranter | ............ | B01D 15/00 |
| | | | | 423/210 |
| 8,636,906 B2 * | 1/2014 | Stein | ............ | B03C 1/01 |
| | | | | 210/683 |
| 2003/0155303 A1 * | 8/2003 | Harck | ............ | B01D 15/00 |
| | | | | 210/683 |
| 2006/0041116 A1 * | 2/2006 | Marshall | ............ | B01J 43/00 |
| | | | | 536/31 |
| 2007/0080115 A1 * | 4/2007 | Sylvester | ............ | B01J 20/06 |
| | | | | 210/688 |
| 2007/0210005 A1 * | 9/2007 | Fang | ............ | C02F 1/281 |
| | | | | 210/683 |
| 2010/0258448 A1 * | 10/2010 | Whitehead | ............ | C22B 3/24 |
| | | | | 205/538 |
| 2015/0068980 A1 * | 3/2015 | Bakather | ............ | C02F 1/288 |
| | | | | 210/663 |
| 2016/0221838 A1 | 8/2016 | Colley et al. | | |
| 2016/0229711 A1 | 8/2016 | Boodoo et al. | | |

* cited by examiner

COMPOSITIONS AND METHODS FOR SELENIUM REMOVAL

CROSS-REFERENCE TO RELATED APPLICATION

This non-provisional application claims the benefit of U.S. Provisional Application No. 62/547,280 filed Aug. 18, 2017. The disclosure of the prior application is hereby incorporated by reference in its entirety.

BACKGROUND

The purification and filtration of water and other aqueous solutions to remove toxic materials, such as selenium, is necessary for many applications, such as the treatment of feeds, waste streams, process streams and by-products associated with various industrial processes, the provision of safe portable drinking water, and the treatment and control of municipal waste water. The presence of various compound forms of selenium in water is of great environmental concern as selenium-containing compounds can be extremely toxic. Additionally, regulatory agencies have placed strict guidelines on discharging selenium to the environment. In particular, facilities that generate selenium are restricted to 12 parts per billion (ppb) discharge limits and in many cases must treat to less than 5 ppb.

In aqueous environments or water, dissolved inorganic Se is normally present as (+6 oxidation state) selenate ($SeO_4^{-2}$) and as (+4 oxidation state) selenite ($SeO_3^{-2}$). The soluble inorganic Se forms, selenite and selenate, account for the majority of the total Se concentration found in natural, agricultural, or discharged waters and other aqueous solutions. The proportion of selenate/selenite present in waters is generally governed by the pH-redox status of the system. Selenate is stable under alkaline and oxidizing conditions and selenite is stable under mildly oxidizing conditions. The ratio of selenate to selenite present in natural waters is also affected by the different adsorption kinetics of selenate versus selenite. Selenite has a strong affinity for a variety of common minerals at pH values less than 7, whereas selenate does not; selenite also has a strong affinity for particulate organic matter. Constituents adsorbing selenite include Al and Fe oxides, clay minerals, and calcite. Also some microbial populations selectively assimilate selenite over selenate. Due to the many available mechanisms for selenite removal from waters, selenate is the major soluble Se species that remains in treated waters.

Known methods for purifying aqueous solutions to remove selenium that take advantage of such behaviors/properties (of selenite) include, for example, reverse osmosis, distillation, ion-exchange, chemical adsorption, coagulation, flocculation, and filtering or retention. However, with respect to removal of selenate, many of these purification practices are ineffective and/or inefficient (in terms of time, energy and added waste), and require significant technical know-how and sophistication to implement.

For example, chemical coagulants such as ferric oxide are cheap and effective at removing selenite when fed in excess, but large amounts of sludge are also generated and show little efficacy for removing selenate. Activated alumina has also been shown to be an effective media for removing selenite, but gives poor results for selenate removal. While biological reactors have been shown to remove both selenite and selenate by reduction to elemental selenium, these systems cost around $30 million to treat 300-400 gpm (gallon per minute) of water. Additionally, microbiological upsets occur causing selenium levels to spike. As a result, many advanced fluid purification technologies have had limited application with respect to removal and collection of selenate (itself) from waters and other aqueous solutions.

There remains a need for improved removal methods (in terms of, for example, cost, simplicity, reliability, efficiency and selectivity) for removal of selenate from water. The improved methods would desirably contain an active composition stable to decomposition (i.e., a composition that neither bleeds into surrounding water, nor decomposes to form a harmful substance). The disclosure that follows describes such methods and compositions for removing selenium containing ions, such as selenate, from water.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates to methods for removing selenium from an aqueous fluid, the methods including obtaining a feed fluid comprising water and dissolved selenate; contacting the feed fluid with a rare earth impregnated media comprising a resin to remove at least a portion of the selenate from the feed fluid thereby forming a treated fluid with less selenium than the feed fluid; where at least about 20 ppb of the dissolved selenate is present in the feed fluid, and the amount of selenium in the treated fluid is less than 12 ppb.

In some embodiments, the present disclosure relates to methods including contacting a feed fluid comprising water and dissolved selenate with a rare earth impregnated media to remove at least a portion of the selenate from the feed fluid thereby forming a treated fluid with less selenium than the feed fluid; where the rare earth impregnated media comprises cerium and a resin, at least about 100 ppb of the dissolved selenate is present in the feed fluid, the feed fluid is contacted with a sufficient quantity of the rare earth impregnated media such that the rare earth impregnated media affixes the selenate to such an extent that 90 wt. % or more of the selenium, on an elemental selenium basis, is removed from the feed fluid.

In some embodiments, the present disclosure relates to methods for removing selenium from an aqueous fluid, the methods including obtaining a contaminated fluid comprising water and dissolved selenate and dissolved selenite; converting at least some of the selenite of the contaminated fluid into selenate to form a feed fluid; contacting the feed fluid with a rare earth impregnated media to remove at least a portion of the selenate from the feed fluid thereby forming a treated fluid with less selenium than the feed fluid; where the rare earth impregnated media comprises a resin, at least about 100 ppb of the dissolved selenate is present in the feed fluid, the feed fluid is contacted with a sufficient quantity of the rare earth impregnated media such that the rare earth impregnated media affixes the selenate to such an extent that 90 wt. % or more of the selenium, on an elemental selenium basis, is removed from the feed fluid.

In some embodiments, the present disclosure relates to methods including contacting a feed fluid comprising water and a dissolved selenate with a rare earth impregnated media to remove at least a portion of the selenate from the feed fluid thereby forming a treated fluid with less selenium than the feed fluid; where the rare earth impregnated media comprises cerium, the rare earth impregnated media comprises more than 90% cerium oxide, at least about 100 ppb of the dissolved selenate is present in the feed fluid, the feed fluid is contacted with a sufficient quantity of the rare earth impregnated media such that the rare earth impregnated media affixes the selenate to the media to an extent such that 90 wt. % or more of the selenium that was initially contained in the feed fluid, on an elemental selenium basis is removed from the feed fluid.

In some embodiments, the present disclosure relates to methods including contacting a feed fluid comprising water and a dissolved selenate with a rare earth impregnated media for removal of at least a portion of the selenate from the feed fluid thereby forming a treated fluid comprising less selenium than the feed fluid; where the rare earth impregnated media comprises cerium, the rare earth impregnated media is substantially free of lanthanum, at least about 100 ppb of the dissolved selenate is present in the feed fluid, the feed fluid is contacted with a sufficient quantity of the rare earth impregnated media such that the rare earth impregnated media affixes about 90 wt. % or more of the selenate that was initially contained in the feed fluid, on an elemental selenium basis.

BRIEF DESCRIPTION OF THE DRAWINGS

Other aspects of the present invention will become apparent as the following description proceeds and upon reference to the following figures which represent illustrative embodiments.

DETAILED DESCRIPTION

Figure 1:
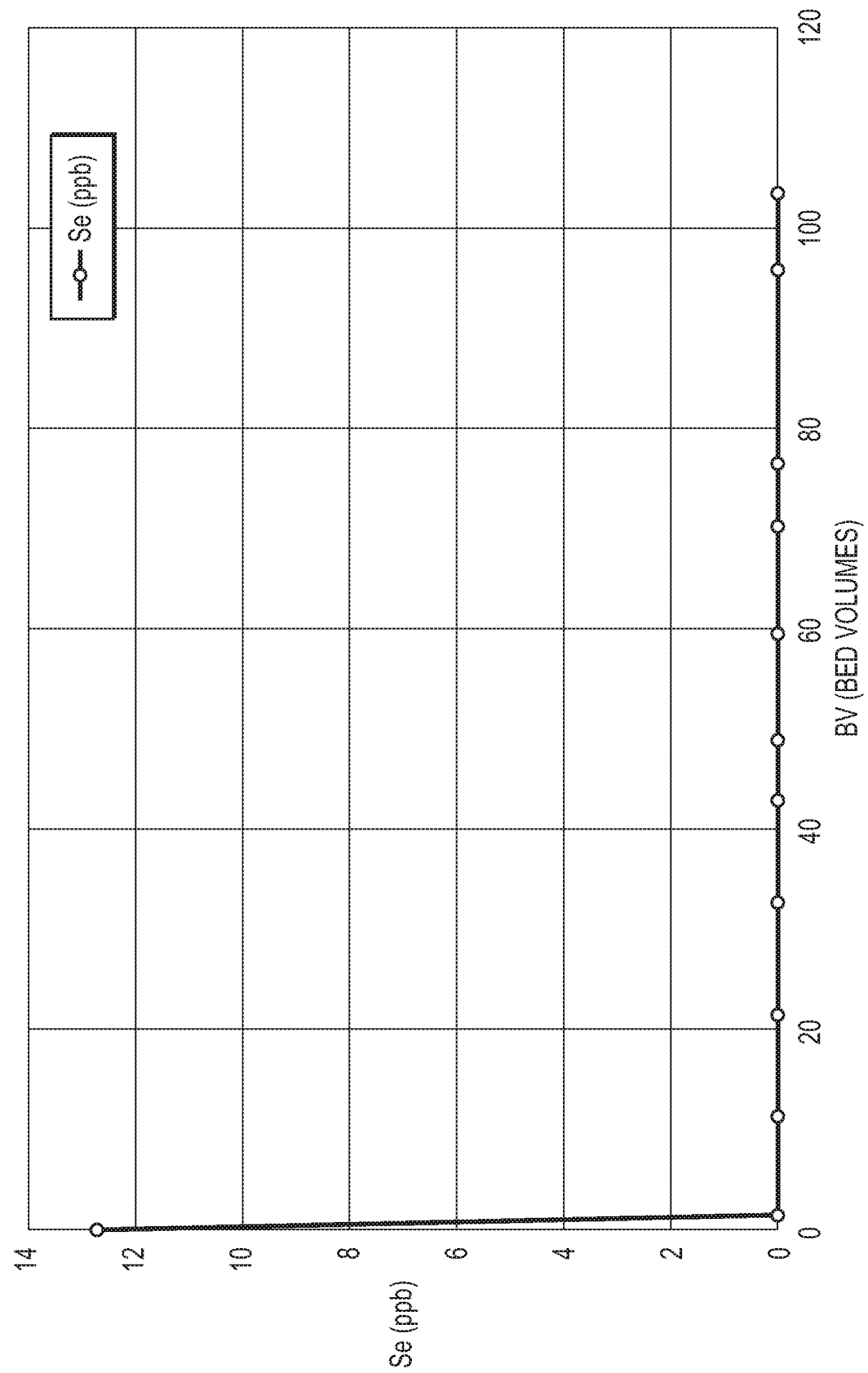
FIG. 1 is a graph illustrating the selenium concentration of a feed fluid being treated with the inventive cerium impregnated media (where an SBA resin was impregnated with cerium)

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. The term "about" should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The methods, compositions, and systems of the present disclosure generally relate to removing selenium, such as a target selenium entity (for example, a selenium-containing anion, such as selenate and/or selenite), from fluids (such as water) that are relatively rich in the target selenium entity, particularly selenate, via a reaction/interaction with an entity (such as, for example, a cationic entity) to form a target-loaded material that may be further processed in any desired manner.

In some embodiments, such fluids that are relatively rich in selenate may result from coal ash ponds and/or the generation of power from coal (where procedures must be undertaken to prevent a number of undesirable pollutants being placed into the environment). For example, in the generation of power from coal, many of the gases that are produced as a result of coal combustion, such as oxides of nitrogen and sulfur, will react with water in the environment to produce acid rain. Such gases may also contain oxides of heavy metals including selenium. Fly ash, which constitutes fine solid particles which rise with such flue gas, generally contains oxides of heavy metals as well. In order to treat flue gases so to remove acid forming compounds (such as $SO_2$ and $SO_3$), many power plants treat flue gas with carbonate-containing materials such as bicarbonate or limestone. While such systems are effective for removing sulfur oxides from flue gas, such methodology can result in the production of fly ash that has increased amounts of selenate as a consequence of the use of an alkaline sorbent material during treatment of the flue gas. As a consequence, the proportion/ratio of the very difficult to remove form of selenium (i.e., selenate) is drastically increased in such feed fluids formed in connection with the generation of power from coal.

The inventors of the application have surprisingly found that even when the fluid to be treated is a fluid having substantial amounts of interfering/competing ions (e.g., such a coal-combustion source) and a high concentration of selenium, where a majority of the selenium is in the form of selenate—the rare earth impregnated media of the present disclosure can be used to effectively treat such a fluid and achieve a treated fluid having a final concentration of selenium of less than about 50 ppb, or less than about 25 ppb, or less than about 12 ppb, or less than about 10 ppb, or less than about 5 ppb, or less than about 1 ppb. Such substantial amounts of the interfering/competing ions may be, for example, at a concentration in the range of from about 500 to about 9,000 ppm, or an interfering/competing ion level at concentration ranging from about 2,000 to about 8,000 ppm, or from about 3,000 to about 7,000 ppm. In some embodiment, if desired, a pre-treatment step or interfering/competing ion removal step (such as an known ion exchange method) may be used to reduce the interfering/competing ion level to any suitable concentration, such as an interfering ion concentration level of less than 9,000 ppm, or less than 5,000 ppm, less than 3,000 ppm, such as an interfering ion concentration level ranging from about 1,000 to about 3,000 ppm, or from about 1,000 to about 2,000 ppm. Examples of the interfering ions may include anionic ions; sulfates; carbonates; phosphates; chlorides; fluorides; cationic ions; alkaline earth metals and alkali metals, either disassociated ions and/or complexed to anions, such as hydroxide, $NO_3^-$, $HCO_3^-$, etc.

Prior to describing the various embodiments, the following definitions are provided and should be used unless otherwise indicated.

Definitions

The term "target selenium entity" refers to a selenium-containing ion, such as an anion, like selenate and/or selenite, that is to be selectively removed from a fluid, such as an aqueous feed fluid, like water. In some embodiments, the target selenium entity may be one or more members selected from the group consisting of selenate, selenite, and a selenium-containing anion.

The term "fluid" refers to any water-containing liquid, e.g., fluids that are mostly water, or over 95 weight percent water or 99 weight percent water. The fluid may be a feed fluid relatively rich in a target selenium entity and originate from a source where it is required (or a source where it would be beneficial) to remove/recycle a selenium-containing anion, such as selenate and/or selenite, from the feed fluid (or a waste stream). The fluid can be any fluid stream comprising one or more target selenium entities and may be derived from any source. Examples of suitable fluids that may be relatively rich in one or more target selenium entities are recreational waters, municipal waters (such as, sewage, waste, agricultural, or ground waters), industrial (such as cooling, boiler, or process waters), wastewaters, mining waters, well waters, septic waters, drinking waters, naturally occurring waters, (such as a lake, pond, reservoir, river, or stream), and other waters and/or aqueous process streams.

Examples of recreational waters are swimming pool waters, brine pool waters, therapy pool waters, diving pool waters, sauna waters, spa waters, and hot tub waters. Examples of municipal waters are drinking waters, waters for irrigation, well waters, waters for agricultural use, waters for architectural use, reflective pool waters, water-fountain waters, water-wall waters, use, non-potable waters for municipal use and other non-potable municipal waters.

Wastewaters may include municipal and/or agricultural run-off waters, septic waters, waters formed and/or generated during an industrial and/or manufacturing process (e.g., industrial processes such as coal fired power plants or solar panel manufacturing), coal ash ponds, waters formed and/or generated during the capture of fly ash, waters formed and/or generated by a medical facility, waters associated with mining, mineral production, recovery and/or processing (including petroleum), evaporation ponds waters, and non-potable disposal waters.

Well waters may include waters produced from a subsurface well for the purpose of human consumption, agricultural use (including consumption by an animal, irrigation of crops or consumption by domesticated farm animals), mineral-containing waters, waters associated with mining and petroleum production. Examples of naturally occurring waters include associated with rains, storms, streams, rivers, lakes, aquifers, estuaries, lagoons, and such.

The term "insoluble" refers to materials that remain as solids in a fluid/solvent, such as water. Insoluble materials are able to be retained in a device, such as a bed (e.g., a packed-bed, fixed-bed or fluidized bed) and/or column, or be readily recovered from a reaction using physical means, such as filtration. Substantially insoluble materials are capable of prolonged exposure to a fluid/solvent, such as water, over weeks or months, with little loss of mass in the form of dissolved materials, e.g., less than about 2% mass loss of the insoluble material after a prolonged exposure to a fluid/solvent, such as water (over weeks or months), or less than about 0.1% mass loss of the insoluble material after a prolonged exposure to a fluid/solvent, such as water (over weeks or months).

The term "rare earth" refers to one or more element selected from yttrium, scandium, lanthanum, cerium, praseodymium, neodymium, samarium, europium, gadolinium, terbium, dysprosium, holmium, erbium, thulium, ytterbium, and lutetium. In the present disclosure, lanthanum, cerium, praseodymium, neodymium, samarium, europium, gadolinium, terbium, dysprosium, holmium, erbium, thulium, ytterbium, and lutetium may also be referred to as "lanthanoids." The rare earth can be a mixture of different rare earth elements, such as two or more of yttrium, scandium, lanthanum, cerium, praseodymium, neodymium, samarium, europium, gadolinium, terbium, dysprosium, holmium erbium, thulium, ytterbium, and lutetium; or, in some embodiments, two or more of yttrium, scandium, cerium, lanthanum, praseodymium, and neodymium. Any suitable rare earth ions, such as trivalent, tetravalent, or pentavalent cations, may be used in the methods, compositions and systems of the present disclosure. The rare earth ions used in the methods, compositions and systems of the present disclosure are generally of a cationic form, and may be of the same or different valence and/or oxidation states and/or numbers.

"Selenium-containing anion" refers, for example, to anion form of selenium (Se), such as for example, the oxygenated ionic forms of Se, which are selenate ($SeO_4^{-2}$) and selenite ($SeO_3^{-2}$).

The term "surface area" refers to surface area of a material and/or substance determined by any suitable surface area measurement method. Preferably, the surface area is determined by any suitable Brunauer-Emmett-Teller (BET) analysis technique for determining the specific area of a material and/or substance.

The term "uptake" refers, for example, to a process resulting in the association and/or immobilization of a rare earth with a surface and/or the interior of the substrate (e.g., such as rare earth impregnated media).

The terms "immobilize" or "immobilization" refers to the capture or attachment (such as via a chemical bond and/or via physical entrapment) of a rare earth on, or in the porous interior of, a substrate, such a surface of an insoluble substrate, that occurs in such a manner to leave at least a portion of the rare earth in a state that it is capable of interacting and/or reacting with a target selenium entity. In embodiments, this may include a precipitated rare earth that is physically fixed within the pores of a substrate, such as resin (i.e., rare earth impregnated media).

Embodiments

In embodiments, the present disclosure relates to methods, compositions, and systems for removing a target selenium entity, from fluids/feed fluids, such as water, relatively rich in the target selenium entity (i.e., fluids in which the target selenium entity is present in amounts to the extent that it would be beneficial to remove the target selenium entity, for example, such as where greater than 12 ppb of a target selenium entity is dissolved within the fluid, or at least 20 ppb of a target selenium entity is dissolved within the fluid, or at least 50 ppb of a target selenium entity is dissolved within the fluid, or at least 100 ppb of a target selenium entity is dissolved within the fluid, or at least 10 ppm of a target selenium entity is dissolved within the fluid, or at least 100 ppm of a target selenium entity is dissolved within the fluid, or at least 1000 ppm of a target selenium entity is dissolved within the fluid).

In some embodiments, the feed fluids to be treated by the methods of the present disclosure (from which the target selenium entity is to be removed) may contain from about 20 ppb to about 5,000 ppm of a target selenium entity dissolved within the fluid, such as from about 40 ppb to about 500 ppm of a target selenium entity dissolved within the fluid, or from about 50 ppb to about 1 ppm, or from about 100 ppb to about 500 ppb of a target selenium entity dissolved within the fluid.

In other embodiments, the fluids to be treated by the methods of the present disclosure (from which the target selenium entity is to be removed) may contain a very low initial amount of the target selenium entity to be removed, such as from about 12 ppb to about 400 ppb of a target selenium entity dissolved within the fluid, such as from about 20 ppb to about 200 ppb of a target selenium entity dissolved within the fluid, or from about 20 ppb to about 100 ppb, or from about 20 ppb to about 50 ppb of a target selenium entity dissolved within the fluid.

The target selenium entity may be removed by contacting a feed fluid comprising the target selenium entity with a rare earth impregnated media, which, in some embodiments, may be a substrate comprising an immobilized cationic rare earth to form a treated fluid, where the substrate and the immobilized rare earth (such as, for example, an immobilized cationic rare earth) may be present in an amount effective to remove a predetermined amount of target selenium entity from the fluid. In some embodiments, the predetermined amount may be the amount of target selenium entity necessary to achieve a final concentration of selenium (or the target selenium entity) of less than about 50 ppb, or less than about 25 ppb, or less than about 12 ppb, or less than about 10 ppb, or less than about 5 ppb, or less than about 1 ppb. In some embodiments, the predetermined amount may be the amount of target selenium entity necessary to achieve a final concentration of selenium (or the target selenium entity) in the treated fluid in a range of from about 50 ppb to 0.1 ppb, or in a range of from about 25 ppb to 0.1 ppb, or in a range of from about 12 ppb to 0.1 ppb, or in a range of from about 10 ppb to 0.2 ppb, or in a range of from about 5 ppb to 0.5 ppb, or in a range of from about 3 ppb to 1 ppb.

The effective amount of substrate and the immobilized rare earth (such as, for example, an immobilized cationic rare earth) may depend on a number of factors, such as, for example, the particular immobilized rare earth, the rare earth loading capacity of the substrate, and the desired amount of target selenium entity to be removed. In some embodiments, for example, the immobilized rare earth may be a cationic rare earth that is precipitated in a manner such that the precipitated form of the rare earth is fixed inside the porous structure of the substrate and/or fixed on the surface of the substrate.

While the discussion below identifies a resin as the particular porous substrate of the rare earth impregnated media being modified and loaded with rare earth, other substrate materials may also be used. Such substrates may include, for example, clays, zeolites, ceramics (such as activated alumina), carbonaceous materials (such as activated carbon), polymers and the like, which may be functionalized, as desired, with suitable functional groups (for example, groups that can function as a base, such as functional trimethylamine and/or quaternary ammonium groups).

In some embodiments, the methods, compositions and systems of the present disclosure may include a rare earth impregnated media including a substrate, such as a resin that upon exposure to an aqueous composition, are capable of physically and/or chemically immobilizing a form of a rare earth. Such rare earth impregnated media may include, for example, a strong base anion resin (e.g., comprising a functionalized polymeric material of styrene and/or divinylbenzene that has been functionalized with a trimethylamine and/or quaternary ammonium groups) that has been impregnated with a rare earth, such as cerium.

A precipitated form of the rare earth may be immobilized in the resin in a manner such that it is fixed/entrapped inside/on the surface of the resin such that a form of the rare earth is available to react with and precipitate (and/or hold) a target selenium entity (thereby removing it from the fluid being treated) and form an insoluble selenium-loaded rare earth impregnated media that may be further processed (such as by further reaction).

In some embodiments, the rare earth impregnated media may be prepared by any suitable methodology that involves the mixing solution of a rare earth salt (such as a saturated solution of the rare earth salt, or a slurry of the rare earth salt) with resin (such as, for example, a strong base anion resin (e.g., comprising a functionalized polymeric material of styrene and/or divinylbenzene that has been functionalized with a trimethylamine and/or quaternary ammonium groups)), in any suitable weight ratio of resin to rare earth salt such that an excess of rare earth is available to be introduced into the resin.

In embodiments, the rare earth may be present in the resin of the rare earth impregnated media at a weight percent of from about 0.001% to about 40% relative to the weight of the substrate alone (e.g., the resin alone), or about 1% to about 35% relative to the weight of the substrate alone (e.g., the resin alone), or about 5% to about 30% relative to the weight of the substrate alone (e.g., the resin alone), or about 8% to about 20% relative to the weight of the substrate alone (e.g., the resin alone). In embodiments, the rare earth may be present in the resin of the rare earth impregnated media at a weight percent of from about 20% to about 30% relative to the weight of the substrate alone (e.g., the resin alone).

In some embodiments, the rare earth impregnated substrate may include cerium (relative to the resin alone) in any desired amount, such as at least about 1,000 ppm cerium (relative to the resin alone). In some embodiments, the cerium may be present in the resin at a weight percent of from about 0.001% to about 40% relative to the weight of the substrate alone (e.g., the resin alone), or about 1% to about 35% relative to the weight of the substrate alone (e.g., the resin alone), or about 5% to about 30% relative to the weight of the substrate alone (e.g., the resin alone), or about 8% to about 20% relative to the weight of the substrate alone (e.g., the resin alone). In embodiments, the cerium may be present in the resin of the rare earth impregnated media at a weight percent of from about 20% to about 30% relative to the weight of the substrate alone (e.g., the resin alone).

In the methods of the present disclosure, in addition to the methodology described above, the uptake of the rare earth into the resin to form a resin comprising the immobilized rare earth (such as, for example, an immobilized cationic rare earth) may occur by any suitable method and to any suitable extent including those described in U.S. Patent Application Publication No. 2016/0096747, the contents of which are hereby incorporated by reference in its entirety.

Suitable rare earth salts for preparing the rare earth impregnated media include, for example, cerium (III) salts (such as cerous chloride, cerous bromide, cerous iodide, cerous sulfate, cerous nitrate, cerous chlorate, and cerous oxalate), ceric (IV) salts (such as ceric chloride, ceric bromide, ceric iodide, ceric sulfate, ceric nitrate, ceric chlorate, and ceric oxalate), lanthanum (III) salts (such as lanthanum chloride, lanthanum bromide, lanthanum iodide, lanthanum chlorate, lanthanum sulfate, lanthanum oxalate, and lanthanum nitrate), and mixtures thereof. Known salts of the other rare earths may also be used to generate the respective rare earth impregnated media.

In some embodiments, the rare earth impregnated media may include a cerium loaded substrate, which, in addition to cerium, comprises one or more other water-soluble rare earths at any desired molar ratio to the cerium. The rare earth elements other than cerium may include yttrium, scandium, lanthanum, praseodymium, neodymium, samarium, europium, gadolinium, terbium, dysprosium, holmium, erbium, thulium, ytterbium, and lutetium. For example, the loaded substrate comprising cerium may contain cerium and one or more other water-soluble rare earth (such as, for example, one or more of lanthanum, neodymium, praseodymium and samarium). The molar ratio of cerium to the other rare earth may be from about 1:1 to about 50:1, or from about 5:1 to about 40:1, or about 15:1 to about 30:1.

In some embodiments, the rare earth impregnated media may include a cerium loaded substrate, which is substantially free of lanthanum, such as less than about 0.5% by weight lanthanum, or less than about 0.1% by weight lanthanum.

In some embodiments, the resin and rare earth salt (such as a saturated solution of the rare earth salt, or a slurry of the rare earth salt) may be allowed to mix/combine in a known vessel or known apparatus for a predetermined amount of time, such as a mixing period sufficient to ensure rare earth salt is fully absorbed into the resin (such as, for example, a strong base anion resin (e.g., comprising a functionalized polymeric material of styrene and/or divinylbenzene that has been functionalized with a trimethylamine and/or quaternary ammonium groups)). In some embodiments, after the rare earth salt is fully absorbed into the resin, a rare earth impregnated media having an immobilized rare earth (such as, for example, an immobilized cationic rare earth) may be formed by precipitating the rare earth such that it is fixed on the resin. Precipitation may be triggered by introducing a base into the mixture.

In some embodiments, a precipitated form of the rare earth may be fixed (i.e., immobilized) inside and/or on the surface of the resin upon initiation of a triggering event brought about by a predetermined condition, such as the presence of a base, such as NaOH, at a pH of about 10 or more, such as a pH of about 11 or more, or a pH of about 12 or more. In some embodiments, once the base is added to the mixture and the rare earth, such as, for example, cerium, is precipitated inside and/or on the surface of the resin to form a immobilized cationic rare earth, the resin comprising the immobilized cationic rare earth may be washed, while maintaining the precipitated rare earth in an immobilized state. For example, in some embodiments, the resin comprising the immobilized cationic rare earth may be washed with deionized water until the pH returns to a pH in the range of from about 6.5 to about 8.5, such as a pH in the range of from about 7 to about 8, or a neutral pH (e.g., a pH of 7).

In some embodiments, at various times during the methods of the present disclosure the rare earth impregnated media (e.g., the resin/substrate) may comprise a mixture of rare earths with multiple naturally occurring oxidation states, such as two or more oxidation states, for example, such as a +3 and a +4 oxidation state for one or more of the rare earths, such as cerium. In some embodiments, the cationic rare earth of the at least one substrate/resin may only be present in a single naturally occurring oxidation state. In some embodiments, the proportions of the various oxidation states of the rare earth that are present in the rare earth impregnated media may be selected to optimize pathway by which the selenium (e.g., the selenate or selenite) is removed from the fluid being treated.

For example, without being bound by theory, (under suitable conditions, such as pH and reactant ratios), it is believed that two of possible pathways by which the soluble selenium species can be removed from the fluid being treated during the methodology of the present disclosure include, for example, (i) reacting a stoichiometric proportion of a rare earth (of a given oxidation state) directly with selenate or selenite to precipitate the selenate or selenite directly (i.e., single step pathways), or (ii) reducing selenate to selenite, and then subsequently precipitating the newly formed selenate. In the methods of the present disclosure the conditions may be tailored such that either one or both pathways assist in the removal of soluble selenium species from the fluid being treated.

For example, regarding the latter removal pathway, cerium (III) may react with selenate to form cerium (IV) and selenite (e.g., in some embodiments, a portion of the cerium (III) of the impregnated media may reduce selenite to selenite). This reaction may take place on a surface or the accessible interior of the rare earth impregnated media (e.g., an fluid accessible surface of the impregnated resin/substrate where the precipitated cerium (III) is present) rather than in the bulk of the fluid being treated. In some embodiments, this newly formed selenite (which is already in the vicinity of the surface of the resin particle) can then be precipitated by the remaining available rare earth (such as cerium (III)) of the impregnated media (i.e., in some embodiments, the removal of selenate from the fluid being treated may involve such a two-step reaction/precipitation process). In this way, the rare earth impregnated media of the present disclosure (e.g., a resin/substrate impregnated with, for example, cerium (III) chloride, and/or any other suitable rare earth (such as those mentioned above, including, for example, lanthanum), can achieve removal of both selenium (IV) and/or selenium (VI) species from a feed fluid (by using an impregnating a suitable rare earth salt, such as cerium chloride, in a media, such as an Strong Base Anion (SBA) Resin).

For example, in the methods of the present disclosure, the majority of the rare earth (such as cerium) may be selected to have a +3 oxidation state (i.e., before and after being precipitated/loaded onto the substrate to form the rare earth impregnated media). For example, at least about 75 wt % of the rare earth (such as cerium) may have a +3 oxidation state, or at least about 95 wt % of the rare earth may have a +3 oxidation state, or at least about 99.9 wt % of the rare earth may have a +3 oxidation state.

In some embodiments, the resin of the rare earth impregnated media may be porous. e.g., the substrate/resin may be selected/prepared to have any desired pore size, such as an average pore size is in a range of from about 10 nm to about 10 μm, or an average pore size in a range of from about 100 nm to about 5,000 nm, or an average pore size in a range of from about 200 nm to about 2,000 nm.

In some embodiments, the porosity of the resin of the rare earth impregnated media may be controlled by adjusting the cross-linking of the polymers/copolymers of the resin of the rare earth impregnated media such that resin (before impregnating the resin with the rare earth) comprises at least some pore volumes in a range of from about 10 to about 200 Ångstroms, such as from about 10 to about 100 Ångstroms, from about 15 to about 50 Ångstroms.

In some embodiments, the resin of the rare earth impregnated media may be may be prepared such that it comprises pore diameters up to several hundred Ångstroms, such as in a range of from about 100 to about 500 Ångstroms or in a range of from about 100 to about 300 Ångstroms. In some embodiments, the surface area the resin of the rare earth impregnated media may in be in a range of from about 300 $m^2/g$ or higher, such as a surface area in a range of from about 400 $m^2/g$ to about 800 $m^2/g$, or a surface area in a range of from about 500 $m^2/g$ to about 700 $m^2/g$.

The resin of the rare earth impregnated media may also be selected/prepared to have any desired porosity, such as such a porosity (a measure of the void (i.e. "empty") spaces in the resin) is in a range of from about 20% to about 80%, or an in a range of from about 30% to about 70%/o, or in a range of from about 40% to about 60%.

In some embodiments, the porous resin suitable for use in the methods of the disclosure for forming the rare earth impregnated media may comprise one or more of the following characteristics: a surface area (Langmuir surface area) greater than about 1 $m^2/g$, such as greater than about 100 $m^2/g$, or greater than about 500 $m^2/g$; a surface area of from about 1 to about 500 $m^2/g$, such as a surface area of from about 5 to about 150 $m^2/g$, or surface area of from about 10 to about 100 $m^2/g$. In some embodiments, the rare earth impregnated media may include a substrate (such as any of those identified above) having a surface area of from about 1 to about 1600 $m^2/g$, such as a surface area of from about 250 to about 600 $m^2/g$, or a surface area of from about 400 to about 600 $m^2/g$.

In some embodiments, the resin of the rare earth impregnated media may be plurality of particles or beads selected/prepared to have any desired size, such as plurality of particles or beads having an average diameter that is in a range of from about 100 nm to about 10 mm, or an average diameter that is in a range of from about 100 μm to about 1 mm, an average diameter that is in a range of from about 200 μm to about 800 μm, or an average diameter that is in a range of from about 500 μm to about 800 μm. In some embodiments, the resin of the rare earth impregnated media may be plurality of particles or beads selected/prepared to a bimodal distribution of sizes and/or porosities.

In some embodiments, the impregnated resin/substrate of the rare earth impregnated media in which the rare earth and/or the rare earth cation (such as cerium (III)) may be bonded, compounded, held and/or absorbed on (or in the pores of) a substrate (such as a chelating resin) may comprise one or more different resins (which may be in ionic and/or compounded forms). For example, in such embodiments, the at least one resin of the rare earth impregnated media may be any suitable compound, polymer and/or material, provided that the compound, polymer and/or material (i) does not interfere with the formation of bond(s) (such as coordinate bonds) between target selenium entity and the rare earth impregnated media, and (ii) is stable (thermally and chemically) in under the treating conditions (e.g., the chemical/physical environment of the liquid being treated (i.e., the chemical/physical environment (e.g., the surrounding chemicals, pH, temperature, etc.) of the aqueous stream, drinking water, potable water, recreational water, water derived from a manufacturing process, wastewater, pool water, spa water, cooling water, boiler water, process water, municipal water, sewage water, agricultural water, ground water, power plant water, remediation water, co-mingled water and combinations thereof)).

In some embodiments, the rare earth impregnated media may include resins, polymers, copolymers and or other materials (such as anion exchange materials), which may be functionalized, such as by subjecting the resin, polymer and/or copolymer to an amination process. Examples of such materials (which may be used as the substrate of the rare earth impregnated media) may include polystyrene, polystyrene/divinylbenzene, polyacrylic, polymeric materials having a carboxylate functional group (such as carboxylate gel type materials derived from one or more of the aforementioned polymers), and/or other polymeric matrices.

In some embodiments, the substrate (of the rare earth impregnated media) to be impregnated with the rare earth (such as, for example, a cationic rare earth) may comprise one or more materials selected from gel-type anion exchange materials, macroporous anion exchange materials and other positively charged substrates including, for example, membranes, filters, fibers, and other materials that are appropriately functionalized to contain anion exchange sites or groups. The anion exchange material may comprises Type I and/or Type II strong base organic resin types that contain quaternary groups with a positively charged nitrogen atom. In some embodiments, the substrate (of the rare earth impregnated media) to be impregnated with the rare earth (such as, for example, a cationic rare earth) may comprise (or further comprise in addition to the above-mentioned substrates) an anion exchange material that is a weak base organic resin (such as in a bead form) containing primary, secondary, and/or tertiary amine groups.

Examples of resins which can be employed in methodology described herein include those resins, polymers, copolymers and or other materials (such as anion exchange materials), such as those disclosed in U.S. Pat. No. 7,407,587, the entire disclosure of which is hereby incorporated by reference in its entirety.

For example, in some embodiments the resin of the rare earth impregnated media may be a quaternized amine product made by the reaction of trimethylamine with a suitable polymer and/or copolymer after chloromethylation. In some embodiments the functionality the resin of the rare earth impregnated media is obtained by the reaction of a styrene polymer/copolymer, such as a styrene-DVB (styrene-divinylbenzene) copolymer with dimethylethanolamine, which results in a quaternary amine functionality.

In some embodiments, the resin of the rare earth impregnated media may be in the form of beads or particles, where the control of the size of the beads or particles may be achieved by controlling the size and crosslinking in seed particles employed, if any, and the amount of monomers employed in the monomer feed. The seed particles may range in size from very small particles, i.e. about 10 nm, to larger particles having a diameter of hundreds or thousands of nm or more.

In some embodiments, the resin of the rare earth impregnated media may be formed as particles or beads, having a core shell structure. In embodiments, the beads or particles of the resins many comprise a functionalized shell as an outer layer of the particle or bead, which may be prepared from a haloalkylated bead by contacting or attaching to the bead a compound reactive with the halogen of the haloalkyl group and which, upon reaction, forms a suitable functional group.

In embodiments, the resin of the rare earth impregnated media may be prepared by contacting a haloalkylated copolymer (such as copolymer comprising a styrene monomer unit) with ammonia, a primary amine or a secondary amine. Exemplary primary and secondary amines include the methyl amine, ethyl amine, butyl amine, cyclohexyl amine, dimethyl amine, diethyl amine, and/or tertiary amines such as trimethyl amine, triethyl amine, tributyl amine, dimethylisopropanol amine, ethylmethylpropyl amine or the like as aminating agents.

The structure and porosity of the resin of the rare earth impregnated media by be selected such that after impregnation with the rare earth the rare earth impregnated media has a porosity similar to that described above. In this regard, the conditions of polymerization of the backbone polymer of the resin can be controlled such that the porosity is large enough that impregnation with the rare earth does not preclude the target selenium entity from diffusing into the rare earth impregnated media.

In some embodiments, the resin of the rare earth impregnated media impregnated with the rare earth may have a core/shell morphology such that that the polymeric structure (e.g., average pore diameter, degree of crosslinking, degree of porosity) of the copolymer resin beads changes from the inside to the outside of the resin bead. The changes in polymeric structure may be somewhat gradual from the inside to the outside of the bead, resulting in a bead having a gradient of polymeric structure along any radius thereof. Alternatively, the changes in polymeric structure may be relatively abrupt as one moves along a radius of the bead outward from the center, yielding a bead having a relatively distinct core having one polymeric structure and a relatively distinct shell having another polymeric structure.

In some embodiments, the rare earth to be impregnated in the resin may impregnate both the "core polymers" and "shell polymers" of such materials (e.g., beads or particles) having a core/shell morphology. In some embodiments, the rare earth to be impregnated in the resin may only impregnate the "shell polymer", for example, which, in some embodiments, may have a higher porosity (i.e., a larger average pore diameter) than that of the core polymer region.

In some embodiments, the resin of the rare earth impregnated media may be cross-linked to an effective amount to exhibit little volume change (swelling), and to improve the oxidation stability thereof.

In some embodiments, after the resin comprising the immobilized rare earth (such as, for example, an immobilized cationic rare earth) is formed, the resin comprising the immobilized rare earth (such as, for example, an immobilized cationic rare earth) may be used to remove a target selenium entity form a treated fluid such that the resin becomes loaded with at least some of the target selenium entity (or loaded to a maximum capacity of the target selenium entity, such as a selenium-containing anion, like selenate and/or selenite). The rare earth impregnated media including the resin/substrate comprising the immobilized rare earth (such as, for example, an immobilized cationic rare earth) may be comprised in a known vessel or known apparatus, and/or may be in any suitable form, such as, for example, a shaped resin substrate of any desirable shape, or a particulate resin substrate dispersed in a liquid formulation. The resin substrate can be supported or unsupported.

The structure of the rare earth impregnated media may also vary depending on the application. In some embodiments, the resin comprising the immobilized rare earth (such as, for example, an immobilized cationic rare earth) can be used where the resin itself may be in any desired shape or form, such as the form of a particle, mesh (such as screens), tubes, honeycomb structures, monoliths, and blocks of various shapes, including, for example, cylinders. In some embodiments, the resin comprising the immobilized rare earth (such as, for example, an immobilized cationic rare earth) may be supported or coated on known solids with or without a binder. The binder may be any suitable known binder.

Thereafter, the resin/substrate loaded with target selenium entity may be regenerated, recycled, removed and/or disposed of, for example, by known methods, such as those described in U.S. Patent Application Publication No. 2016/0096747, the contents of which are hereby incorporated by reference in its entirety.

For example, in embodiments in which the resin loaded with the target selenium entity (such as a selenium-containing anion, like selenate and/or selenite) may be regenerated and reused, the exhausted resin (i.e., resin loaded with the target selenium entity, such as a selenium-containing anion, like selenate and/or selenite) may be treated with an appropriate reagent, such as a base (e.g., a strong base), like an aqueous NaOH wash (e.g., a NaOH wash that includes an amount of NaOH in a range of from about 0.1 to about 12% by weight of a base, such as, for example, NaOH, such as an amount of NaOH in a range of from about 2 to about 10% by weight NaOH, or an amount of NaOH in a range of from about 5 to about 8% by weight NaOH), to regenerate the exhausted resin via releasing the target selenium entity or a form thereof, which returns the resin to a form (i.e., a resin comprising the immobilized cationic rare earth) in which it is ready to capture further target selenium entity (e.g., a selenium-containing anion, such as selenate.

In some embodiments, less than about 0.5% mass loss (or less than about 0.01% mass loss) of the precipitated rare earth (based on the entire mass of the precipitated rare earth in loaded substrate) may occur after a prolonged exposure to a fluid/solvent, such as an aqueous fluid (with a pH in the range of from about 5.0 to about 9, or a pH in the range of from about 6.0 to about 8, or pH in the range of from about 6.5 to about 7.5, or a neutral pH (e.g., a pH of 7) relatively rich in the target selenium entity in an aqueous media within the timeframe for removing a target selenium entity (such as during the course of a treatment operation, or over multiple hours, multiple days, or multiple weeks), from fluids, such as water, relatively rich in the target selenium entity (i.e., the above-described fluids in which the target selenium entity is present in amounts to the extent that it would be beneficial to remove the target selenium entity).

Unless otherwise indicated, the percent mass loss is based on an assessment (via a known analytical technique, such as a X-ray fluorescence (XRF) spectrometry analysis) of the mass of the rare earth alone (e.g., if the rare earth was cerium, a 0.01% mass loss would imply that 0.01% of the elemental cerium had been lost based on the entire mass of the precipitated rare earth in loaded substrate).

In embodiments, the rare earth impregnated media (such as cerium impregnated resin, where the resin is functionalized, for example, with trimethylamine and/or quaternary ammonium groups) may possess a thermal stability range (in which it will not decompose, or less than 1% by mass deterioration or decomposition, such as less than 0.5% by mass deterioration or decomposition) of at least 10° C. higher than the highest temperature that is observed in the fluid (e.g., water containing the target selenium entity) being treated, such as a thermal stability range of at least up to 100° C., or a thermal stability range of greater than about −5° C. to about 100° C.

In some embodiments, the resin comprising the immobilized rare earth (such as, for example, an immobilized cationic rare earth) of the present disclosure may be stored for a predetermined amount of time before use. In some embodiments, the resin comprising the immobilized rare earth (such as, for example, an immobilized cationic rare earth) may be stored for minutes, hours, days, months or years before use.

In some embodiments, contact of the resin comprising the immobilized rare earth (such as, for example, an immobilized cationic rare earth) of the present disclosure with the fluid comprising the target selenium entity, such as a target selenium entity, forms a target-loaded rare earth composition that effectively removes the target selenium entity from the fluid being treated. The target-loaded rare earth composition may comprise the rare earth and the target selenium entity or a component thereof. The target-loaded rare earth composition may be an insoluble precipitate (such as an insoluble precipitate trapped in or on the resin comprising the immobilized cationic rare earth). In such embodiments, a target selenium entity may be removed from the fluid being treated, where the fluid has a predetermined pH value, which, if desired, may be adjusted before the removal step. For example, the pH of the fluid may be (or may be adjusted to be) from about 4 to about 10, or from about 5 to about 9, or from about 6 to about 8. In some embodiments, the pH of the fluid may be of from about pH 6 to about pH 9, or from about pH 6.5 to about pH 8.5. In some embodiments, the pH of the fluid may be (or may be adjusted to be) from about 4 to about 6.9, or from about 5 to about 6.5, or from about 5 to about 6. In some embodiments, the pH of the fluid may be (or may be adjusted to be) from about 7.2 to about 12, or from about 8 to about 11, or from about 9 to about 10.

In some embodiments, a fluid containing a target selenium entity, for example, a selenium-containing anion, such as selenate and/or selenite, may be contacted with the resin comprising the immobilized rare earth (such as, for example, an immobilized cationic rare earth) to form a precipitate of the target selenium entity, for example, a selenium-containing anion, such as selenate and/or selenite (i.e., a target-loaded rare earth composition). Contact may occur by any suitable technique, including adding the fluid to a vessel or system containing the resin comprising the immobilized rare earth (such as, for example, an immobilized cationic rare earth) or vice versa. In embodiments, the rare earth of the resin comprising the immobilized rare earth (such as, for example, an immobilized cationic rare earth) chemically interacts and/or reacts with and precipitates the target selenium entity and/or portion thereof.

In some embodiments, the rare earth of the resin comprising the immobilized rare earth (such as, for example, an immobilized cationic rare earth) chemically reacts with and precipitates at least about 80% of the target selenium entity, for example, a selenium-containing anion, such as selenate and/or selenite, such as precipitates at least about 90% of the target selenium entity, or at least about 95% of the target selenium entity, or at least about 99% of the target selenium entity, or at least about 99.9% of the target selenium entity that is present in the fluid being treated.

The temperature of the fluid during the contacting step can vary. For example, temperature of fluid can vary depending on the source of the water. In some embodiments, the temperature of the fluid is at the IUPAC established standard temperature and pressure. In some embodiments, the fluid temperature may be a temperature in the range of from about 0° C. to about 90° C., or a temperature in the range of from about 5° C. to about 50° C.

In some embodiments, the fluid may be a feed/waste stream that is made to contact and/or passed through the resin comprising the immobilized rare earth (such as, for example, an immobilized cationic rare earth) to remove the target selenium entity, for example, a selenium-containing anion, such as selenate and/or selenite (i.e., before the feed stream is available for its intended operation, or before the waste stream is suitable for discharge). The resin comprising the immobilized rare earth (such as, for example, an immobilized cationic rare earth) may have the surprising capability of removing a substantial portion of the target selenium entity, such as selenate and/or selenite, even when the target selenium entity, such as selenate and/or selenite, is present in the feed stream at a low concentration (such as less than 50 ppb) in the presence of substantial amounts of interfering ions. In other words, surprising feature of the rare earth impregnated media of the present disclosure and the process of this of the present disclosure is its selectivity for selenate, and its deselectivity for other competing anions, such as, for example, sulfate anions, (i.e., virtually every other ion passing through—uncaptured/absorbed/reacted) which prohibit the use of known medias/anion exchange resins without first having to remove such competing anions (such as sulfur compounds) from the waste/feed stream prior to treatment.

Because the resin comprising the immobilized rare earth (such as, for example, an immobilized cationic rare earth) associates/reacts with and precipitates at least about 80% of the target selenium entity, such as selenate and/or selenite, such as at least about 95% of the target selenium entity, such as selenate and/or selenite, or at least about 99% of the target selenium entity, such as selenate and/or selenite, or at least about 99.9% of the target selenium entity, such as selenate and/or selenite, the feed stream that has interacted with the resin comprising the immobilized rare earth (such as, for example, an immobilized cationic rare earth) may be substantially free of target selenium entity (i.e., target selenium entity, such as selenate and/or selenite, content in the treated feed stream is no more than about 50 ppb (such as a range of from about 0.01 ppb to less than 50 ppb), or no more than about 25 ppb (such as a range of from about 0.1 ppb to less than 25 ppb), or no more than about 12 ppb (such as a range of from about 0.1 ppb to less than 12 ppb), or no more than about 10 ppb (such as a range of from about 0.1 ppb to less than 10 ppb), or no more than about 5 ppb (such as a range of from about 0.5 ppb to less than 5 ppb), or no more than about 1 ppb (such as a range of from about 0.5 ppb to less than 1 ppb)).

In some embodiments, the feed stream may be made to contact and/or passed through the resin comprising the immobilized rare earth (such as, for example, an immobilized cationic rare earth) in a single pass operation or a multi pass operation to remove the target selenium entity, for example, a selenium-containing anion, such as selenate and/or selenite. When the target selenium entity, such as selenate and/or selenite, contacts the resin comprising the immobilized rare earth (such as, for example, an immobilized cationic rare earth), a precipitate of the target selenium entity, such as selenate and/or selenite, may be formed.

In addition to the resins described above, the rare earth impregnated media (optionally, in combination with the resins described above) may include other porous and fluid permeable solids having a desired shape and physical dimensions, such as porous and fluid permeable solids having a desired shape and physical dimensions in which the rare earths (or a rare earth containing substance) may be chelated, coated, trapped and/or attached to the porous and fluid permeable solid in a manner that immobilizes the rare earth such that it is available for participation in a precipitation reaction with the target selenium entity (in other words, for selective removal of a target selenium entity). Suitable solids may include, for example, a sintered ceramic, sintered metal, micro-porous carbon, glass fiber, cellulosic fiber, alumina, gamma-alumina, activated alumina, acidified alumina, a metal oxide containing labile anions, crystalline alumino-silicate such as a zeolite, amorphous silica-alumina, clay, ferric sulfate, porous ceramic, and the like. Such other porous and fluid permeable solids can be in the form of mesh, such as screens, tubes, honeycomb structures, monoliths, and blocks of various shapes, including cylinders. The chelating and/or chelated resins can, for example, be supported or coated on the above solids with or without a binder. The binder may be any suitable known binder.

Suitable structural forms of such rare earth impregnated media can also include a woven substrate, non-woven substrate, porous membrane, filter, fabric, textile, or other fluid permeable structure. For example, chelating resin and/or chelated resin can be incorporated into or coated onto a filter block or monolith for use as a filter, such as a cross-flow type filter. The chelating resin and/or chelated resin can be in the form of particles coated on to or incorporated in the above-mentioned rare earth impregnated media.

In one aspect of the present disclosure, some embodiments may relate to an apparatus for removing one or more target selenium entities from a fluid, the apparatus comprising a container, a support structure comprising a rare earth impregnated media provided in the container, a rare earth that is immobilized on the rare earth impregnated media of the support structure. In such embodiments, the rare earth material may be cerium.

In some embodiments, one liter (bulk volume) of the above described rare earth impregnated media may be used to treat from about 50 bed volumes to about 500 bed volumes of the initial feed fluid (subject to treatment) having a concentration of target selenium entity in the range of from about 30 ppb to about 100 ppm. In such embodiments, the treated fluid may a lower content of at least one of the one or more target selenium entities compared to the initial feed fluid (subject to treatment). For example, the treated fluid content for the one or more target selenium entities may be less than about 95% of that the initial feed fluid (prior to treatment), such as less than about 99.9% of that the initial feed fluid (prior to treatment). In some embodiments, the target selenium entity content in the treated fluid is no more than about 50 ppb, or no more than about 25 ppb, or no more than about 12 ppb, or no more than about 10 ppb, or no more than about 5 ppb, or no more than about 1 ppb.

In some embodiments, the rare earth impregnated media has a capacity for removing the target selenium entity (from an initial fluid (subject to treatment)) of at least about 0.01 mg of target selenium entity per gram of the substrate, such as about 0.01 mg to about 50 mg of target selenium entity per gram of the substrate, about 0.05 mg to about 40 mg of target selenium entity per gram of the substrate, or about 0.1 mg to about 20 mg of target selenium entity per gram of the substrate, or about 1 mg to about 10 mg of target selenium entity per gram of the substrate.

In some embodiments, the fluid that is relatively rich in a target selenium entity (i.e., target selenium entity is present a concentration at which it is desirable to remove) may be obtained from one or more of the above-mentioned sources and processed, conveyed and/or manipulated by a water control system.

In some embodiments, the above described substrates and/or rare earth impregnated media (optionally dry or semi-dry resin) may be packed into columns, cartridges, canisters, multimedia filters, geo-bags, or any kind of container or containment that will allow for a flow of the target selenium entity containing aqueous solution into the resin and across the surface of resin, which may be used at any desired point in a water control system and/or treatment operation. Such packed beds or containers are known in the art and, therefore, the formation of the packed bed(s) or container(s) is not described in detail herein. The packed bed(s) or container(s) may include a housing within which the rare earth impregnated media is contained. In some embodiments, spherical beads of the above described rare earth impregnated media may be packed so that spaces are present between the spherical beads to allow the feed stream to contact and/or pass through the packed bed.

In some embodiments, in the treatment operations and methods of the present disclosure the operating pressures may be maintained at any desired level, such as at or below about 30 psi, for example, below about 10 psi. In some of the treatment operations and methods of the present disclosure, relatively short columns can be used to minimize back pressure. For example, the columns can be on the order of about 0.2 m to 1.5 m in length, or about 0.5 m to 1.0 m in length, with fixed beds, packed beds or expanded bed designs, having any suitable bed depths, such as, for example, bed depths not exceeding 20 cm to 25 cm, thus minimizing the pressure drop across the bed (for example, such that a pressure drop across the bed may be less than 5 psi, or less that 3 psi). In some embodiments, dynamic or moving ion exchange beds (which do not have such pressure drops) may be used. In some embodiments, two or more columns can be cascaded in series. The use of cascaded columns may provide a longer contact time for the feed stream. Moreover, multiple columns may also be connected in parallel to increase throughput and scalability of a commercial process.

In some embodiments, X-ray fluorescence may be used to monitor both influent and effluent of the system such that the flow (through the media) of the influent and effluent may be adjusted to meet a predetermined/specific selenium target discharge while maximizing media lifespan. Such methodology coupled with the high selenium removal rates of the media provides for a system that can deliver consistent selenium discharge levels to meet environmental permit levels.

The analysis from this system can be used in a feedback loop to control upstream solid liquid separation processes, polymer addition, ferric addition etc. All of these can impact the amount of selenium hitting the media and thus the performance of the system.

Once the feed stream has passed through the packed bed and the target selenium entities are removed, the feed stream may be used for any desired suitable purpose.

The water control system (or water handling system) components and configuration can vary depending on the treatment process, water, and water source. The methods and water control systems of the present disclosure may be adapted to include the methods of the present disclosure for removing target selenium entities, but otherwise use conventional techniques, processing units and systems known in the art.

For example, the methods of the present disclosure for removing target selenium entities may be used in conjunction with a municipal and/or wastewater control system. For example, the methods of the present disclosure may be employed as treatment of waste waters for removal of a selenium content therein whereby the target selenium entities present in the water, for example, from a water treatment plant, are precipitated via a reaction with a rare earth cation.

The municipal and/or wastewater control systems may have one or more of the following process units: clarifying, disinfecting, coagulating, flocculating, aerating, filtering, separating solids and liquids, digesting, and polishing. The methods of the present disclosure may be employed before, during and/or after the water is being treated by any of the above processing units.

For example, the methods of the present disclosure may be employed removing biological matter (such as bacteria and/or algae), suspended and/or dispersed chemicals and/or particulates from the water, such as by the action of one or more clarifying and/or filtering units.

In some embodiments, the methods of the present disclosure may include a water control system that includes aeration. Within the water control system, aeration may comprise passing a stream of air and/or molecular oxygen through the water contained in the water control system. The aeration process may promote oxidation of selenium compounds contained in the water being processed by the water control system such that the content of selenate is increased. For example, aeration may promote the oxidation of a majority of the soluble selenium-containing compounds to form selenate. In some embodiments, the aeration process converts the selenium-containing compound into a selenate that can be selectively removed by the methods of the present disclosure.

The water control system may or may not have one or more of a heater, a cooler, and a heat exchanger to heat and/or cool the water being processed by the water control system. The heater may be any method suitable for heating the water. The cooler may be any method suitable for cooling the water.

The water control system may or may not include a nutrient control process. If included, the water control system may include one or more nutrient control processes.

The water control system may or may not include a solid/liquid separation process. For example, the water control system may include one or more solid/liquid separation processes. The solid/liquid separation process can comprise any process for separating a solid phase from a liquid phase, such as water. Examples of suitable solid/liquid separation processes are clarification (including trickling filtration), filtration, vacuum and/or pressure filtration, cyclone (including hydrocyclones), floatation, sedimentation (including gravity sedimentation), coagulation, sedimentation (grit chambers), and combinations thereof.

The water control system may or may not include a polisher. The polishing process may include one or more of removing fine particulates and/or precipitates from the water, an ion-exchange process to soften the water, an adjustment to the pH value of the water, or a combination thereof.

While the water control system may include one or more of a clarifying, disinfecting, coagulating, aerating, filtering, separating solids and liquids, digesting, and polishing processes, the water control system may further include additional processing equipment, such a backwash system equipment.

The additional processing equipment may include holding tanks, reactors, purifiers, treatment vessels or units, mixing vessels or elements, wash circuits, precipitation vessels, separation vessels or units, settling tanks or vessels, reservoirs, pumps, cooling towers, heat exchangers, valves, boilers, gas liquid separators, nozzles, tenders, and the like. Furthermore, the water control system includes conduit(s) interconnecting the unit operations and/or additional processing equipment. The conduits may include piping, hoses, channels, aqua-ducts, ditches, and such. The water is conveyed to and from the unit operations and/or additional processing equipment by the conduit(s). Moreover, each unit operations and/or additional processing equipment is in fluid communication with the other unit operations and/or additional processing equipment by the conduits.

In summary, a first aspect of the present disclosure relates to processes for removing selenium from an aqueous fluid, comprising: obtaining a feed fluid comprising water and dissolved selenate; contacting the feed fluid with a rare earth impregnated media comprising a resin to remove at least a portion of the selenate from the feed fluid thereby forming a treated fluid with less selenium than the feed fluid; wherein at least about 20 ppb of the dissolved selenate is present in the feed fluid, and the amount of selenium in the treated fluid is less than 12 ppb.

A second aspect of the present disclosure relates to processes comprising contacting a feed fluid comprising water and dissolved selenate with a rare earth impregnated media to remove at least a portion of the selenate from the feed fluid thereby forming a treated fluid with less selenium than the feed fluid; wherein the rare earth impregnated media comprises cerium and a resin, at least about 100 ppb of the dissolved selenate is present in the feed fluid, the feed fluid is contacted with a sufficient quantity of the rare earth impregnated media such that the rare earth impregnated media affixes the selenate to such an extent that 90 wt. % or more of the selenium, on an elemental selenium basis, is removed from the feed fluid.

A third aspect of the present disclosure relates to processes for removing selenium from an aqueous fluid, comprising: obtaining a contaminated fluid comprising water and dissolved selenate and dissolved selenite; converting at least some of the selenite of the contaminated fluid into selenate to form a feed fluid, contacting the feed fluid with a rare earth impregnated media to remove at least a portion of the selenate from the feed fluid thereby forming a treated fluid with less selenium than the feed fluid; wherein the rare earth impregnated media comprises a resin, at least about 100 ppb of the dissolved selenate is present in the feed fluid, the feed fluid is contacted with a sufficient quantity of the rare earth impregnated media such that the rare earth impregnated media affixes the selenate to such an extent that 90 wt. % or more of the selenium, on an elemental selenium basis, is removed from the feed fluid.

A forth aspect of the present disclosure relates to processes comprising contacting a feed fluid comprising water and a dissolved selenate with a rare earth impregnated media to remove at least a portion of the selenate from the feed fluid thereby forming a treated fluid with less selenium than the feed fluid; wherein the rare earth impregnated media comprises cerium, the rare earth impregnated media comprises more than 90% cerium oxide, at least about 100 ppb of the dissolved selenate is present in the feed fluid, the feed fluid is contacted with a sufficient quantity of the rare earth impregnated media such that the rare earth impregnated media affixes the selenate to the media to an extent such that 90 wt. % or more of the selenium that was initially contained in the feed fluid, on an elemental selenium basis is removed from the feed fluid.

A fifth aspect of the present disclosure relates to processes comprising contacting a feed fluid comprising water and a dissolved selenate with a rare earth impregnated media for removal of at least a portion of the selenate from the feed fluid thereby forming a treated fluid comprising less selenium than the feed fluid; wherein the rare earth impregnated media comprises cerium, the rare earth impregnated media is substantially free of lanthanum, at least about 100 ppb of the dissolved selenate is present in the feed fluid, the feed fluid is contacted with a sufficient quantity of the rare earth impregnated media such that the rare earth impregnated media affixes about 90 wt. % or more of the selenate that was initially contained in the feed fluid, on an elemental selenium basis.

The present disclosure also relates to an apparatus for removing one or more target selenium entities from a fluid, such as via the any of the preceding aspects, the apparatus comprising: a container; and a rare earth impregnated media provided in the container, the rare earth impregnated media including a resin, and the resin being loaded with an immobilized rare earth that is precipitated inside a porous structure of the resin and/or on a surface of the resin.

In any of the preceding aspects (and the apparatus), the rare earth of the rare earth impregnated media includes a rare earth with multiple naturally occurring oxidation states, such as where the rare earth is a cationic rare earth (e.g., cerium; here the rare earth impregnated media is substantially free of lanthanum, and/or the rare earth may consist only of cerium) or where the rare earth is present in only one naturally occurring oxidation state. Additionally, such a rare earth can be present in the rare earth impregnated media in an amount of from about 0.1 wt % to about 40 wt % of the weight of the resin. Furthermore, the selenate is present in the feed fluid in an amount in the range of from 200 ppb to 5,000 ppm. Any of the preceding aspects may also further comprise regenerating a capacity of the rare earth impregnated media for removing selenate by treating the rare earth impregnated media with a solution comprising a base (such methodology including passing the base solution through the rare earth impregnated media, wherein after the solution is passed through the rare earth impregnated media it includes a precipitate of the selenate, removing the treated fluid from the rare earth impregnated media having an amount of selenate that is lower than an amount of the selenate in the feed fluid that contacts the rare earth impregnated media, and determining the amount of the selenate in the treated fluid, and performing the regenerating step if the amount of the selenate in the treated fluid exceeds a threshold amount, and optionally, at least substantially exhausting a capacity of the rare earth impregnated media for removing the selenate from the feed fluid before performing the regenerating step). In addition, in such aspects (and the apparatus), the resin can comprise a functionalized polymeric material, the polymeric material including monomer units of styrene and divinylbenzene, where the polymeric material is crosslinked, and the functionalized polymeric material is functionalized with a trimethylamine group and/or a quaternary ammonium group. Optionally, the rare earth impregnated media is in the form of a particle having a core/shell morphology, where the shell of the particle has either a higher porosity than the core of the particle and/or a larger average pore diameter than the core of the particle, and the rare earth of the rare earth impregnated media is only present in the shell of the particle.

The foregoing is further illustrated by reference to the following examples, which are presented for purposes of illustration and are not intended to limit the scope of the present disclosure.

EXAMPLES

Cerium loaded resins: Example 1: Purolite® A501P Polystyrenic (cross-linked with divinylbenzene (DVB)) Macroporous Type I Strong Base Anion (SBA) Resin (chloride form) was used as the polymer matrix. The resin was in the form of spherical beads (with a Type I Quaternary Ammonium functional group) of a particle size range of 425-1200 µm. In order to impregnate the resin with cerium, 50 grams of the resin was soaked for four hours in 100 g of a cerium chloride solution.

After four hours, the cerium chloride was decanted off and 300 grams of a 5% NaOH solution was added and mixed with agitation for 15 minutes. Thereafter, the 5% NaOH was poured/filtered off and the resulting media was washed with RO (reverse osmosis) water to remove any unbound cerium on the surface of the media.

Apart from replacing the resin with that listed in Tables 1 and 2, the other cerium loaded medias of Examples 2 and 3 (and Comparative Examples 3-5) were prepared in a similar manner.

Comparative Examples 1 and 2

Purolite® FerrIX® A33E Polystyrenic Macroporous Chloride form (Comparative Example 1) and Amberlite) IRA-410 Chloride Form (Comparative Example 2) were used as received from the manufacturer.

A standard solution of 6164.0 ppm of selenate ion solution was prepared.

A predetermined volume of the 6164.0 ppm phosphate ion stock solution was passed through a tube with fine mesh on one end to hold respective samples of the resins. In the test, the volume of the stock solution was poured in the tube all at once and allowed to gravity filter/drain and the selenate content of the final solution was assessed via inductively coupled plasma mass spectrometry (ICP-MS) via the standard tests according to EPA 6020A (see EPA 6020A Revision 1, January 1998)). The results are shown in Tables 1 and 2:

TABLE 1

| | Examples | | |
|---|---|---|---|
| | Sample Number | | |
| | Example 1 | Example 2 | Example 3 |
| Resin type | SBA | SBA | SBA |
| Anion form | Cl− | Cl− | Cl− |
| Polymer matrix | Macroporous polystyrene crosslinked with DVB | Styrene/ DVB copolymer | Styrene/ DVB copolymer |

TABLE 1-continued

Examples

| | Sample Number | | |
|---|---|---|---|
| | Example 1 | Example 2 | Example 3 |
| Functionalization | Type I quarternary | Trimethyl amine | Trimethyl amine |
| Weight % Ce in the Media | 27.6 | 4.5 | 9.8 |
| Starting selenate concentration (ppm) | 6164.0 | 6164.0 | 6164.0 |
| Selenium removed (ppm) | 4821.0 | 4377.5 | 4324.5 |
| Final selenate concentration (ppm) | 1343.4 | 1786.4 | 1839.5 |
| % removal | 78.2 | 71.0 | 70.2 |
| Capacity (weight %) | 8.8 | 8.6 | 9.6 |

TABLE 2

Comparative Examples

| | Sample Number | | | | |
|---|---|---|---|---|---|
| | Comparative Example 1 | Comparative Example 2 | Comparative Example 3 | Comparative Example 4 | Comparative Example 5 |
| Resin type | SBA | SBA | N/A | NA | Adsorbent |
| Anion form | Cl⁻ | Cl⁻ | N/A | N/A | N/A |
| Polymer matrix | Polystyrene crosslinked with DVB | Styrene/DVB copolymer | Macroporous polystyrene crosslinked with divinylbenzene copolymer | Macroporous polystyrene crosslinked with divinylbenzene copolymer | Acrylic |
| Functionalization | N/A | Dimethyl Ethanol ammonium | N/A | N/A | Non ionic |
| Weight % Ce in the Media | N/A | N/A | 0.1 | 0.1 | 0.1 |
| Starting selenate concentration (ppm) | 6164.0 | 6164.0 | 6164.0 | 6164.0 | 6164.0 |
| Selenium removed (ppm) | 3464.5 | 2796.0 | 2796.0 | 2796.0 | 2796.0 |
| Final selenate concentration (ppm) | 2699.5 | 3368.0 | 6093.5 | 5937.5 | 5926.0 |
| % removal | 56.2 | 45.4 | 1.1 | 3.7 | 3.9 |
| Se Capacity (weight %) | 6.9 | 5.6 | 0.1 | 0.5 | 0.5 |

In the above Tables, the Se Capacity was assessed as follows: 125 milliliters of a solution of selenate was prepared at a concentration high enough (generally about 4500 ppm; if the capacity of the media is estimated to be more than 9% a higher concentration may be needed) to saturate 5 grams of the media's coordination or co-precipitation sites. 25 milliliters of the solution was allocated for determining the starting ion concentration. Then, the remaining 100 milliliters of the solution was added to the 5 grams of media in a 250 mL Griffin low form beaker and the media and the solution is allowed to soak for 4 hours while stirring occasionally. After 4 hours, the sample was briefly stirred, and the resin was allowed to settle. A 5 mL sample of the supernatant was acidified with 1-2 drops concentrated HNO₃ and the ion concentration was determined using ICP-MS.

The following equation was used to calculate % capacity:

$$= \frac{(\text{Before (ppm)} - \text{After (ppm)}) * \frac{\text{Volume of the solution }(L)}{1000}}{\text{grams of the media}} * 100$$

Tests with non-SBA resins (such as non-ionic acrylic resins or non-functionalized macroporous polystyrene crosslinked with DVB) achieved results (for the above-tested properties) that were over an order of magnitude worse than that of Comparative Example 2.

Comparative Example 3

A stock solution of a 225 ppb selenate was passed through a column having a height of 20 cm and a radius of 0.5 cm in which approximately 5 cm of Aqueous Solutions Global's AP (Oxidation) media was layered on top of and Aqueous Solutions Global's AM (Adsorption) media. The column was run at a flow rate of 4 mL per minute (superficial velocity of 1.24 mL/cm²) for a contact time of 3.9 minutes.

The data collected shows that only 3.5 mg of selenate was removed from 13.8 mg of selenate available (i.e., only selenate 25% removal) in the stock solution. Whereas, this conventional media (when run in the same sequence under the same conditions; e.g., over the course of 15,000 bed volumes flown through the column) was able to remove selenite at the levels of approximately 70 to 80%.

Further tests of the inventive cerium impregnated media were also conducted with first stock solution with an initial selenate concentration of 2600 ppm, and a second stock solution with an initial selenite concentration of 2800 ppm. In these tests, the same inventive cerium impregnated media was exposed to the respective stock solution for a predetermined amount of time with and without stirring. The tested media removed 52.30% (2.72% Se removed capacity) of the selenate (in the test with stirring) and 58.46% (3.04% Se removed capacity) of the selenate without stirring. The tested media removed 45.00% (2.52% Se removed capacity) of the selenate (in the test with stirring) and 47.85% (2.68% Se removed capacity) of the selenate without stirring. Such tests show that in some embodiments, the inventive cerium impregnated media will selectively remove selenate over selenite.

Trace Selenium Removal Examples

Additional tests of the inventive cerium impregnated media (which employed an SBA resin impregnated with cerium) were also conducted in which a treated solution was achieved with a selenium concentration that was below the detection limit (via ICP-MS) of selenium (i.e., below 1 ppb selenium). This treated solution was formed by exposing an aliquot of stock solution with an initial selenium (selenate) concentration of 12.72 ppb to a column packed with the inventive cerium impregnated media. As illustrated in FIG. 1, within 30 mL of the stock solution being run (flow rate of 6 mL/min) through a 0.5 cm (radius) column in which a height of 25 cm of the inventive cerium impregnated media was present, a treated solution with a selenium concentration that was below the detection limit (via ICP-MS) of selenium (i.e., below 1 ppb selenium) was achieved (and no bleed of the selenium was detected during the testing).

Figure 2:
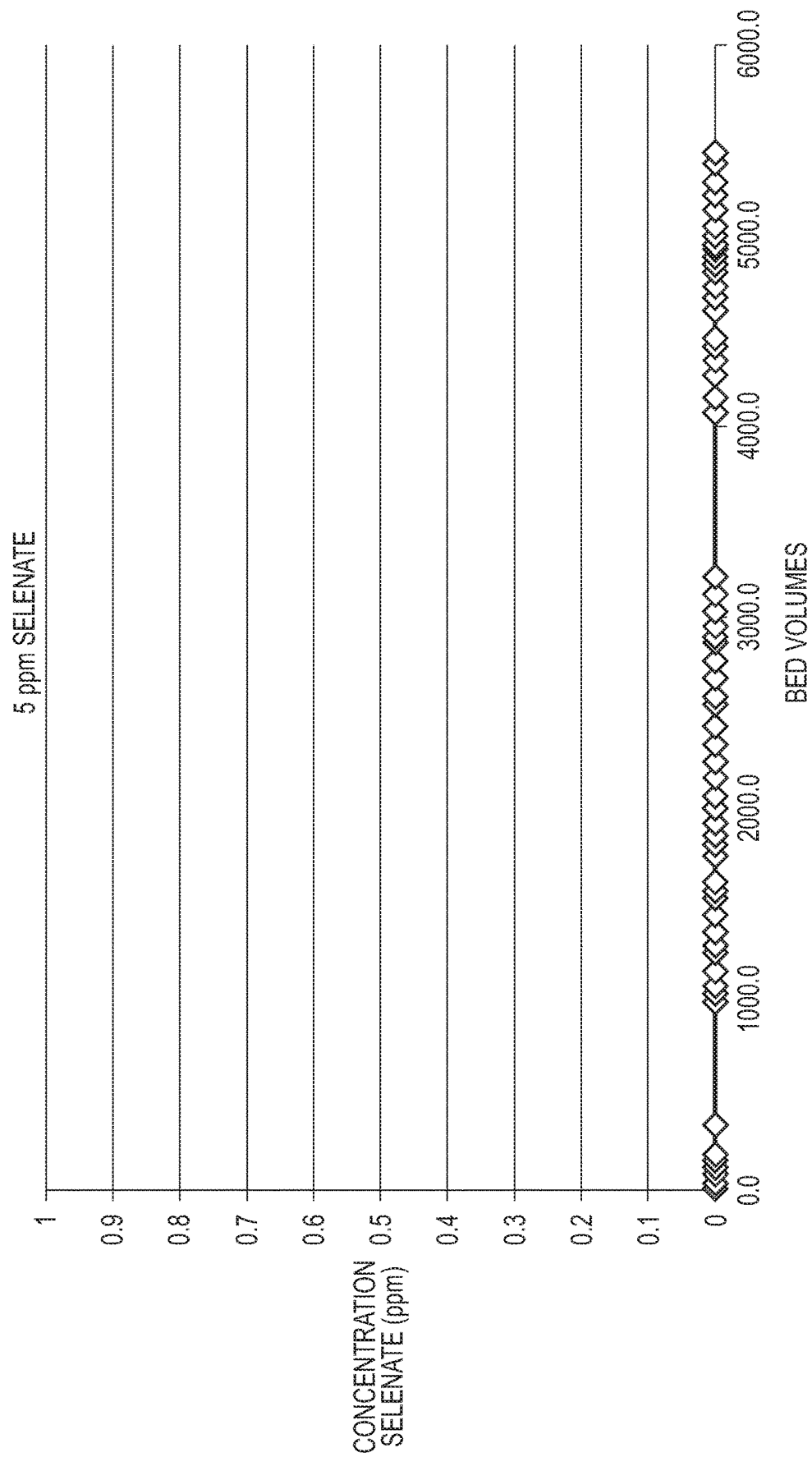
FIG. 2 is a graph illustrating the selenium concentration of a feed fluid being treated with the inventive cerium impregnated media (where an SBA resin was impregnated with cerium)

Similar results were also achieved for an experiment involving a aliquot of a stock solution with an initial selenate concentration of 5 ppm, which, apart from a height of the inventive cerium impregnated media being 12 cm, was tested under similar conditions. The results are set forth in FIG. 2, and reflect that a treated solution with a selenate concentration that was below 1 ppb selenate and/or below the detection limit of ICP-MS was achieved within one bed volume of the column (and no bleed of the selenium was detected during the testing).

Figure 3:
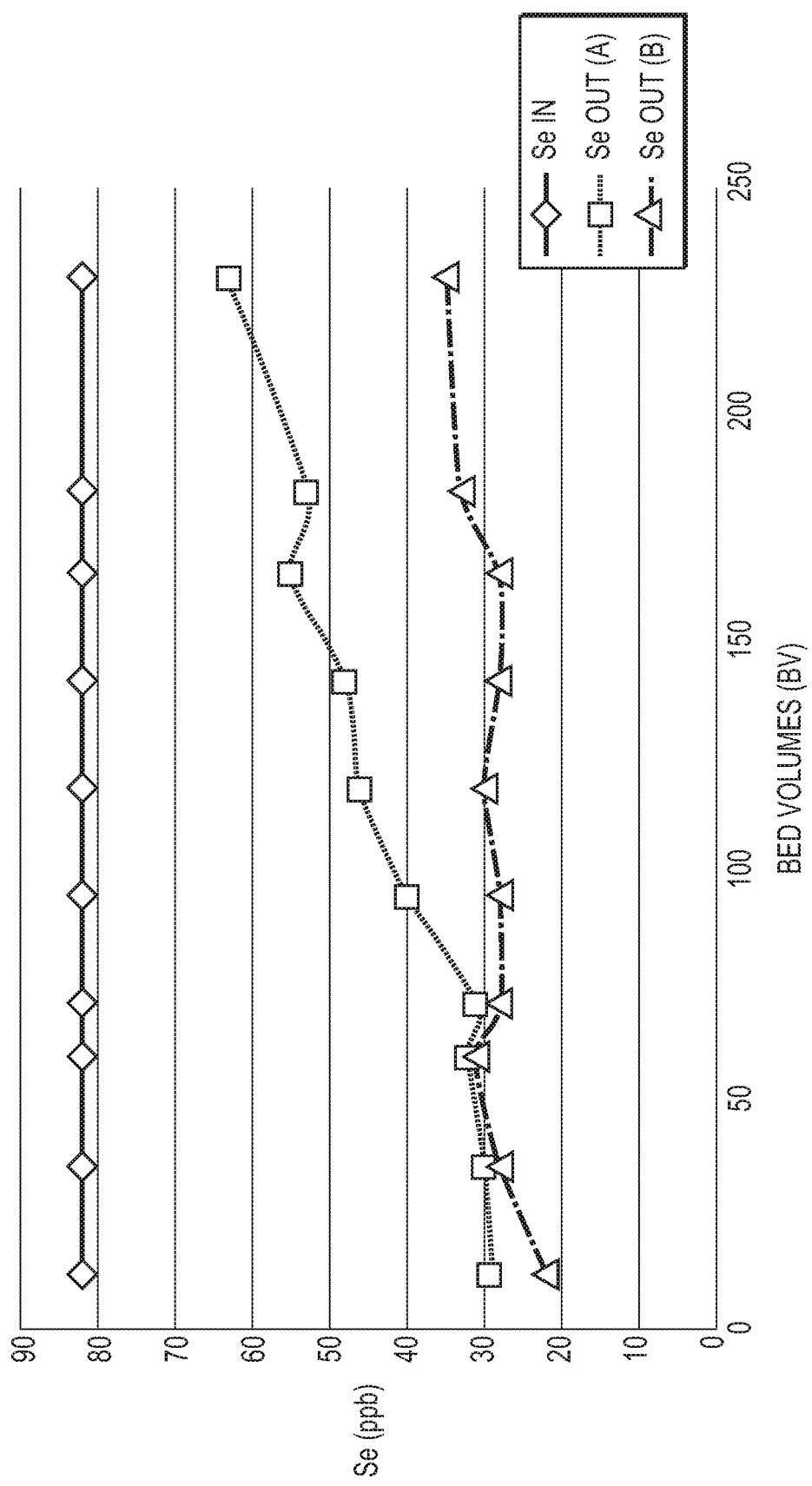
FIG. 3 is a graph illustrating the selenium concentration of a feed fluid from an effluent from a flue gas desulfurization system being treated with the inventive cerium impregnated media (where an SBA resin was impregnated with cerium).

Competitive Ion Selenium Removal Examples
(Treatment of an Effluent from a Flue Gas
Desulfurization System FIG. 3 depicts the results of additional tests of the inventive cerium impregnated media (which employed an SBA resin impregnated with cerium) in which a treated solution was obtained from an effluent from a flue gas desulfurization system. The effluent contained various other species/ions generally present in an effluent from a flue gas desulfurization system (such as Calcium, Magnesium, Iron, Copper, Zinc, Sodium, Potassium, Chloride, Sulfate, Nitrate, Silica, Aluminum, Lithium, Manganese, Molybdenum, Nickel, Strontium, etc.). As illustrated by the results set forth in FIG. 3, the starting concentration of selenium was over 80 ppb and even in the presence of such other species/ions, passing the feed fluid (at a flow rate of 6 mL/min) through the inventive cerium impregnated media that was packed into a 0.5 cm (radius) column (i.e., column "A" or column "B") at a height of 25 cm removed a large portion of the selenium.

Although the preceding description has been described herein with reference to particular means, materials and embodiments, it is not intended to be limited to the particulars disclosed herein; rather, it extends to functionally equivalent structures, methods and uses, such as are within the scope of the appended claims. Furthermore, although only a few example embodiments have been described in detail above, those skilled in the art will readily appreciate that many modifications are possible in the example embodiments without materially departing from the present disclosure. Accordingly, all such modifications are intended to be included within the scope of this disclosure as defined in the following claims. It is the express intention of the applicant not to invoke 35 U.S.C. § 112(f) for any limitations of any of the claims herein, except for those in which the claim expressly uses the words 'means for' together with an associated function.

What is claimed is:

1. A method for removing selenium from an aqueous fluid, comprising:
    obtaining a feed fluid comprising water and dissolved selenate;
    contacting the feed fluid with a rare earth impregnated media comprising a resin to remove at least a portion of the selenate from the feed fluid thereby forming a treated fluid with less selenium than the feed fluid; and
    regenerating a capacity of the rare earth impregnated media for removing selenate by treating the rare earth impregnated media with a solution comprising a base; wherein
        the resin comprises a functionalized polymeric material, the functionalized polymeric material including monomer units of styrene and divinylbenzene,
        at least about 20 ppb of the dissolved selenate is present in the feed fluid, and
        the amount of selenium in the treated fluid is less than 12 ppb.

2. A method comprising contacting a feed fluid comprising water and dissolved selenate with a rare earth impregnated media to remove at least a portion of the selenate from the feed fluid thereby forming a treated fluid with less selenium than the feed fluid; and regenerating a capacity of the rare earth impregnated media for removing selenate by treating the rare earth impregnated media with a solution comprising a base; wherein
    the rare earth impregnated media comprises cerium and a resin,
    the resin comprises a functionalized polymeric material, the functionalized polymeric material including monomer units of styrene and divinylbenzene,
    at least about 100 ppb of the dissolved selenate is present in the feed fluid,
    the feed fluid is contacted with a sufficient quantity of the rare earth impregnated media such that the rare earth impregnated media affixes the selenate to such an extent that 90 wt. % or more of the selenium, on an elemental selenium basis, is removed from the feed fluid.

3. A method for removing selenium from an aqueous fluid, comprising:
    obtaining a contaminated fluid comprising water and dissolved selenate and dissolved selenite;
    converting at least some of the selenite of the contaminated fluid into selenate to form a feed fluid;
    contacting the feed fluid with a rare earth impregnated media to remove at least a portion of the selenate from the feed fluid thereby forming a treated fluid with less selenium than the feed fluid; wherein
    the rare earth impregnated media comprises a resin,
    at least about 100 ppb of the dissolved selenate is present in the feed fluid,
    the feed fluid is contacted with a sufficient quantity of the rare earth impregnated media such that the rare earth impregnated media affixes the selenate to such an extent that 90 wt. % or more of the selenium, on an elemental selenium basis, is removed from the feed fluid.

4. The method of claim 1, wherein the rare earth of the rare earth impregnated media includes a rare earth with multiple naturally occurring oxidation states.

5. The method of claim 1, wherein the rare earth is a cationic rare earth that is present in only one naturally occurring oxidation state.

6. The method of claim 1, wherein the rare earth is cerium.

7. The method of claim 1, wherein the rare earth consists of cerium.

8. The method of claim 1, wherein the rare earth impregnated media is substantially free of lanthanum.

9. The method of claim 1, wherein the rare earth is present in the rare earth impregnated media in an amount of from about 0.1 wt % to about 40 wt % of the weight of the resin.

10. The method of claim 1, wherein the selenate is present in the feed fluid in an amount in the range of from 200 ppb to 5,000 ppm.

11. The method of claim 1, further comprising passing the base solution through the rare earth impregnated media, wherein after the solution is passed through the rare earth impregnated media it includes a precipitate of the selenate.

12. The method of claim 11, further comprising removing the treated fluid from the rare earth impregnated media having an amount of selenate that is lower than an amount of the selenate in the feed fluid that contacts the rare earth impregnated media, and determining the amount of the selenate in the treated fluid, and performing the regenerating step if the amount of the selenate in the treated fluid exceeds a threshold amount.

13. The method according to claim 12, further comprising at least substantially exhausting a capacity of the rare earth impregnated media for removing the selenate from the feed fluid before performing the regenerating step.

14. The method of claim 3, wherein the resin comprises a functionalized polymeric material, the functionalized polymeric material including monomer units of styrene and divinylbenzene.

15. The method claim 1, wherein the functionalized polymeric material is crosslinked.

16. The method according to claim 1, wherein the functionalized polymeric material is functionalized with a trimethylamine group and/or a quaternary ammonium group.

17. The method according to claim 1, wherein the functionalized polymeric material is crosslinked and is functionalized with a trimethylamine group.

18. The method of claim 1, wherein the resin of the rare earth impregnated media is in the form of a particle having a core/shell morphology.

19. The method of claim 18, wherein
the shell of the particle has either a higher porosity than the core of the particle and/or a larger average pore diameter than the core of the particle, and the rare earth of the rare earth impregnated media is only present in the shell of the particle.

* * * * *